(12) United States Patent
Ehrlich

(10) Patent No.: US 10,730,568 B2
(45) Date of Patent: Aug. 4, 2020

(54) SINGLE SHEAR FASTENER STABILIZER

(71) Applicant: Wabash National, L.P., Lafayette, IN (US)

(72) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 29 days.

(21) Appl. No.: 15/881,233

(22) Filed: Jan. 26, 2018

(65) Prior Publication Data

US 2018/0208253 A1 Jul. 26, 2018

Related U.S. Application Data

(60) Provisional application No. 62/450,709, filed on Jan. 26, 2017.

(51) Int. Cl.
| | | |
|---|---|---|
| *B62D 33/04* | (2006.01) | |
| *B62D 27/02* | (2006.01) | |
| *B62D 65/02* | (2006.01) | |

(52) U.S. Cl.
CPC .......... *B62D 33/044* (2013.01); *B62D 27/02* (2013.01); *B62D 33/046* (2013.01); *B62D 65/024* (2013.01)

(58) Field of Classification Search
CPC .... B62D 33/044; B62D 65/024; B62D 27/02; B62D 33/046
See application file for complete search history.

(56) References Cited

U.S. PATENT DOCUMENTS

| | | |
|---|---|---|
| 2,172,571 A | 9/1939 | Theriault |
| 2,322,088 A | 6/1943 | Black |
| 2,384,965 A | 9/1945 | Reid |
| 4,015,876 A | 4/1977 | Hulverson et al. |
| 4,212,405 A | 7/1980 | Schmidt |
| 4,357,047 A | 11/1982 | Katz |
| 4,455,807 A | 6/1984 | Ehrlich |
| 4,685,721 A | 8/1987 | Banerjea |
| 4,703,948 A | 11/1987 | Ehrlich |
| 4,940,279 A | 7/1990 | Abott et al. |
| 4,958,472 A | 9/1990 | Ehrlich |
| 5,066,066 A | 11/1991 | Yurgevich et al. |
| 5,112,099 A | 5/1992 | Yurgevich et al. |
| 5,286,079 A | 2/1994 | Zubko et al. |
| 5,439,266 A | 8/1995 | Ehrlich |
| 5,509,714 A | 4/1996 | Schmidt |

(Continued)

FOREIGN PATENT DOCUMENTS

| | | |
|---|---|---|
| WO | 8300467 A1 | 2/1983 |
| WO | 9810974 A1 | 3/1998 |

*Primary Examiner* — D Glenn Dayoan
*Assistant Examiner* — Melissa Ann Bonifazi
(74) *Attorney, Agent, or Firm* — Quarles & Brady LLP

(57) ABSTRACT

A stabilizer designed to be used in a single shear fastening configuration to secure a composite panel to an adjacent material is disclosed. The front side of the composite panel is flush with the adjacent material and the back of the composite panel is flush with the stabilizer. As a result, the adjacent material and the stabilizer sandwich the composite panel and mimic a double shear configuration. The stabilizer helps to prevent fastening devices (e.g., screws, rivets, nails) from pulling through the composite panel and adds to the mechanical strength of the fastening application.

20 Claims, 11 Drawing Sheets

(56) References Cited

U.S. PATENT DOCUMENTS

| | | | |
|---|---|---|---|
| 5,787,816 | A | 8/1998 | Dworakowski et al. |
| 5,860,693 | A | 1/1999 | Ehrlich |
| 5,876,089 | A | 3/1999 | Ehrlich |
| 5,992,117 | A | 11/1999 | Schmidt |
| 5,997,076 | A | 12/1999 | Ehrlich |
| 6,003,932 | A | 12/1999 | Banerjea et al. |
| 6,220,651 | B1 | 4/2001 | Ehrlich |
| 6,412,854 | B2 | 7/2002 | Ehrlich |
| 6,450,564 | B1 | 9/2002 | Sill |
| 6,527,335 | B1 | 3/2003 | Yurgevich |
| 6,578,902 | B2 | 6/2003 | Sill |
| 6,626,622 | B2 | 9/2003 | Zubko |
| 6,988,761 | B1 | 1/2006 | Stidham et al. |
| 7,014,253 | B2 | 3/2006 | Oren |
| 7,069,702 | B2 | 7/2006 | Ehrlich |
| 7,114,762 | B2 | 10/2006 | Smidler |
| 8,424,958 | B2 * | 4/2013 | Wylezinski .......... B62D 33/046 29/525.01 |
| 2006/0237992 | A1 * | 10/2006 | Lemmons ............ B62D 33/023 296/186.1 |

\* cited by examiner

SINGLE SHEAR FASTENER STABILIZER

RELATED APPLICATIONS

This application claims priority under 35 U.S.C. § 119 to U.S. Provisional Patent Application No. 62/450,709 filed on Jan. 26, 2017, the entire contents of which are incorporated herein by reference.

BACKGROUND

Composite panels may be used in a variety of applications in structural engineering, transportation and the automobile industry, or any place where low weight materials may be desired without sacrificing mechanical performance or material strength. Furthermore, the composite panels typically comprise an inner core member disposed between two sheets in a sandwich configuration. The inner core may be solid or partially hollow and each design has its advantages. For composite panels having an inner core that is at least partially hollow, the inner core lowers the weight of the composite panel, while still maintaining structural strength of the panel. However, one potential drawback of using an inner core that is at least partially hollow is that rivets or other coupling mechanisms can pull through the outside of the sheet of the composite panel. Therefore, it may be useful to utilize a mechanism that improves the stability and strength of a composite panel having a core that is at least partially hollow in a single shear fastening application.

SUMMARY

Some embodiments provide a single shear fastening mechanism for a tractor trailer. In particular, the single shear fastening mechanism comprises a rail configured to support at least a portion of the tractor trailer, a composite panel having at least a partially hollow core, a stabilizer positioned adjacent the composite panel, and a plurality of fasteners extending through the rail, the composite panel, and the stabilizer to secure the composite panel in a single shear configuration.

In further embodiments, the stabilizer may be provided in a form of a rectangular body having a flat interior surface and a flat exterior surface. The stabilizer may also comprise at least one bulb on the flat exterior surface thereof and, in particular embodiments, the stabilizer may comprise a first bulb extending from an upper edge of the flat exterior surface and a second bulb extending from a lower edge of the flat exterior surface.

In some embodiments, the first bulb and the second bulb may extend outwardly from the flat exterior surface a distance greater than a distance that the plurality of rivets extend from the flat exterior surface. Further, the first bulb and the second bulb may each include a recess therein.

In some embodiments, the composite panel may further comprise an inner sheet and an outer sheet, and the rail may be positioned adjacent the inner sheet of the composite panel and the stabilizer may be positioned adjacent the outer sheet of the composite panel. Further, a gap may be provided between a bottom edge of the composite panel and a ledge of the rail.

Additional embodiments provide a single shear fastening mechanism for a tractor trailer comprising a rail configured to support at least a portion of the tractor trailer, a composite panel having at least a partially hollow core, a stabilizer comprising a vertical sidewall and a horizontal sidewall protruding from the vertical sidewall, and a plurality of rivets extending through the rail, the composite panel, and the stabilizer to secure the composite panel in a single shear configuration. Further, the stabilizer may be positioned adjacent the composite panel.

In some embodiments, the vertical sidewall of the stabilizer may include a flat interior surface and a flat exterior surface. Further, the stabilizer may comprise a first bulb extending from an upper edge of the flat exterior surface and a second bulb extending from a lower edge of the flat exterior surface. In particular embodiments, the first bulb and the second bulb may extend outwardly from the flat exterior surface a distance greater than a distance that the plurality of rivets extend from the flat exterior surface. The first bulb and the second bulb may also each include a recess therein.

In further embodiments, the composite panel may also comprise an inner sheet and an outer sheet, and the rail may be positioned adjacent the inner sheet of the composite panel and the vertical sidewall of the stabilizer may be positioned adjacent the outer sheet of the composite panel. Additionally, a first gap may be provided between a bottom edge of the composite panel and a ledge of the rail. In particular embodiments, a second gap may be provided between a front endwall of the horizontal sidewall and the rail. The vertical sidewall and the horizontal sidewall of the stabilizer may also form an L-shaped body.

Further embodiments provide a method of fastening a composite panel to a rail of a tractor trailer assembly. The method may comprise the step of providing a rail of a tractor trailer, a composite panel, a stabilizer, and at least one fastener. Further, the method may comprise the steps of positioning an inner sheet of the composite panel adjacent the rail of the tractor trailer, positioning the stabilizer adjacent an outer sheet of the composite panel, and inserting the at least one fastener through the rail of the tractor trailer, the composite panel, and the stabilizer.

Further, the method may include the step of providing a gap between a bottom edge of the composite panel and a lower ledge of the rail of the tractor trailer.

DETAILED DESCRIPTION

Figure 1:
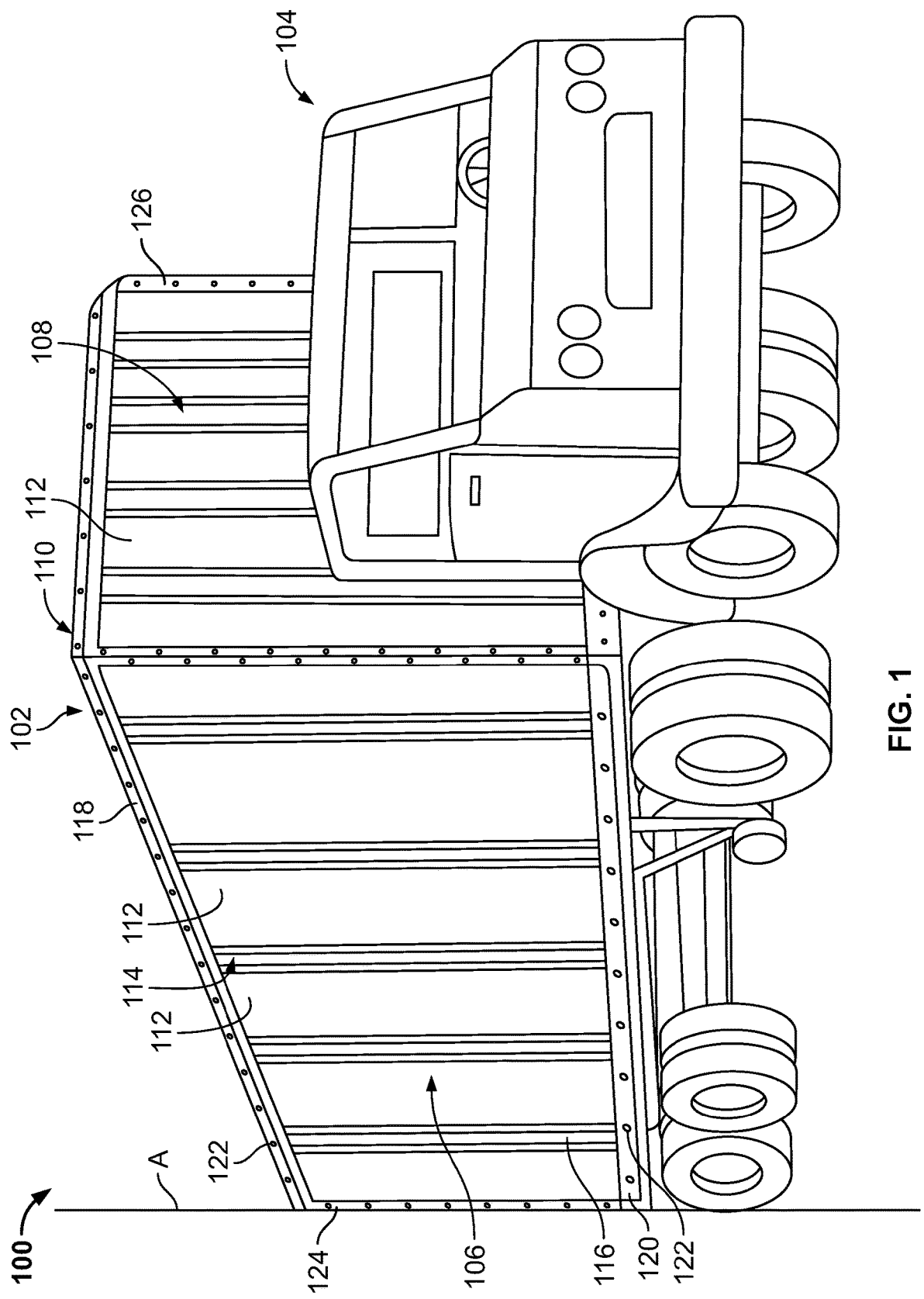
FIG. 1 is a perspective view of a front and left side of a trailer having sidewalls that include a plurality of composite panels.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 depicts a tractor trailer assembly 100 including a trailer 102 designed to carry cargo and a tractor 104 having an engine and a cab section. The trailer 102 is substantially rectangular and may be partially defined by a roof assembly 110 and a floor assembly (not depicted) disposed opposite the roof assembly 110. The roof assembly 110 and the floor assembly may be coupled to opposite sidewalls 106, a front end wall assembly 108, and a rear end wall assembly (not shown) including an overhead door. Alternatively, the rear end wall assembly may include two doors mounted in a conventional manner such that the doors are hingedly coupled to and swing between an open and closed position. Further, the trailer 102 may be releasably coupled to the tractor 104 by conventional means, such as a fifth wheel, for example.

Portions of each sidewall 106, the front end wall assembly 108, the roof assembly 110, the floor assembly, and/or rear end wall assembly of the trailer 102 may be made from a plurality of composite panels 112. The composite panels 112 may be coupled to each other using a number of different fasteners and/or joint configurations. In one embodiment, the composite panels 112 may be coupled to each other via joint configurations 114 including a logistics plate (not shown) and a splicing plate 116. In some embodiments, the composite panels 112 may be coupled together along a longitudinal axis using rivets, screws, welding adhesives or the like.

Additionally, as shown in FIG. 1, the composite panels 112 may be coupled to a top rail 118 and a bottom rail 120 using a plurality of rivets 122. In further embodiments, the composite panels 112 may be coupled to the top rail and a bottom rail 120 using alternative fasteners, e.g., screws, adhesives, or the like. One or more composite panels 112 may also be coupled to one or more vertically oriented rails 124, 126 that are aligned with and substantially parallel to a longitudinal axis A of the trailer 102 using a fastener, e.g., rivets. The vertical rails 124, 126 may also be disposed between the panels 112 at various points along the length of the trailer 102 and/or at positions along the perimeter of the trailer 102. Other joint configurations and other fasteners, for example, screws, bolts, nails, welding adhesives, and the like, may be used to couple adjacent composite panels 112 together, the composite panels 112 to the top rail 118 and/or the bottom rail 120, and/or the composite panels 112 to the vertical rails 124, 126.

Figure 2:
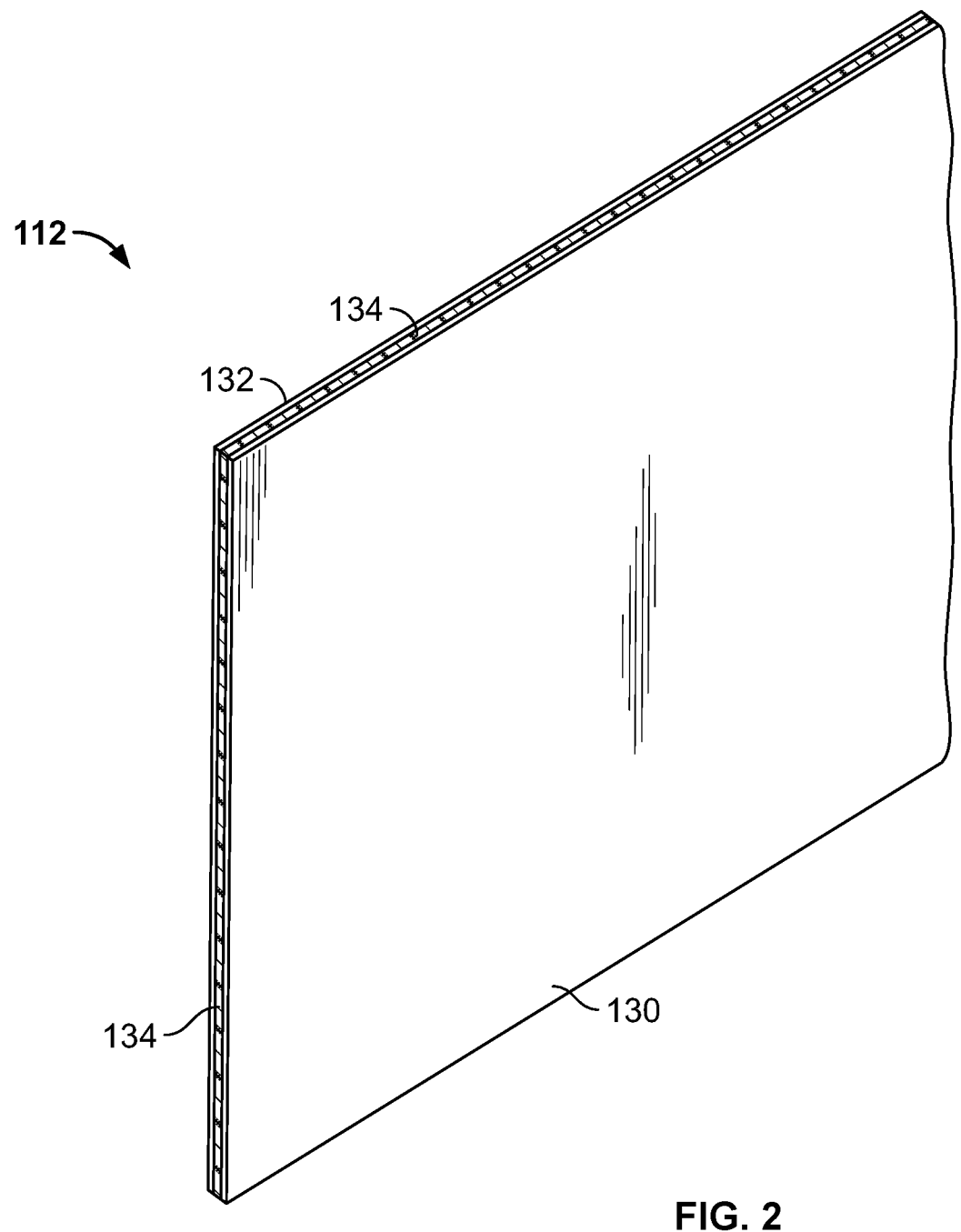
FIG. 2 is an isometric view of a portion of a composite panel, having two outer sheets and an inner core.

FIG. 2 depicts a portion of one composite panel 112 that may be provided in the form of an inner sheet 130, an outer sheet 132 disposed opposite of the inner sheet 130, and a core member 134 positioned between the inner sheet 130 and outer sheet 132. The inner sheet 130 and the outer sheet 132, respectively, may be formed from high-strength, high-tensile steel plates, aluminum, other metals, plastics, reinforced plastics and/or other alloys. The inner sheet 130 and the outer sheet 132 may also be formed from other materials including, for example, bioplastics, wood, thermoplastic, and/or polymers. Further, the core member 134 may be provided in the form of a thermoplastic material, a metal, a metal alloy, or other suitable material.

The inner sheet 130 and the outer sheet 132 may be bonded to the core member 134 by a suitable adhesive layer (not shown). In one embodiment, the inner sheet 130 and the outer sheet 132 may be bonded to the core member 134 by a suitable flexible adhesive bonding film such as, for example, modified polyethylene. It may be understood that other suitable adhesives or joining mechanisms may be used as well. When fully assembled, the outer sheets 132 of each panel 112 cooperate to form an exterior surface of the sidewalls 106, front end wall assembly 108, and rear end wall assembly (not shown) of the trailer 102, while the inner sheets 130 of each panel 112 cooperate to form an interior surface of the sidewalls 106, front end wall assembly 108, and rear end wall assembly (not shown) of the trailer 102.

In the present embodiment, the inner sheet 130 and the outer sheet 132 are metal and can be formed of aluminum or full hard, high strength, high tension, galvanized steel. However, it should be understood that any suitable inner sheet and outer sheet may be used as well, including other metals, metal alloys, or plastics.

The core member 134 may be provided in a variety of different configurations with respect to the inner sheet 130 and the outer sheet 132. In one embodiment, the core member 134 may be provided as a solid thermoplastic material that does not include portions that are hollowed, perforated, embossed metal, or honeycomb formed. In another embodiment, the core member 134 is provided as an at least partially hollow thermoplastic material that specifically includes portions that are hollowed, perforated, embossed metal, or honeycomb formed. In this embodiment, the core member 134 may comprise over 75%, or over 85%, or over 95% by volume of material that is not solid (i.e., partially hollow or substantially hollow). In yet another alternative embodiment, the core member 134 may be corrugated or segmented.

FIGS. 3-7 show various embodiments of a stabilizer that is designed to be used when securing a composite panel 112 to a surface in a single shear configuration. Generally, the stabilizer contacts the composite panel 112 and a securing mechanism (e.g., rivets) are driven through the stabilizer, composite panel, and surface to secure the composite panel to the surface.

Figure 3A:
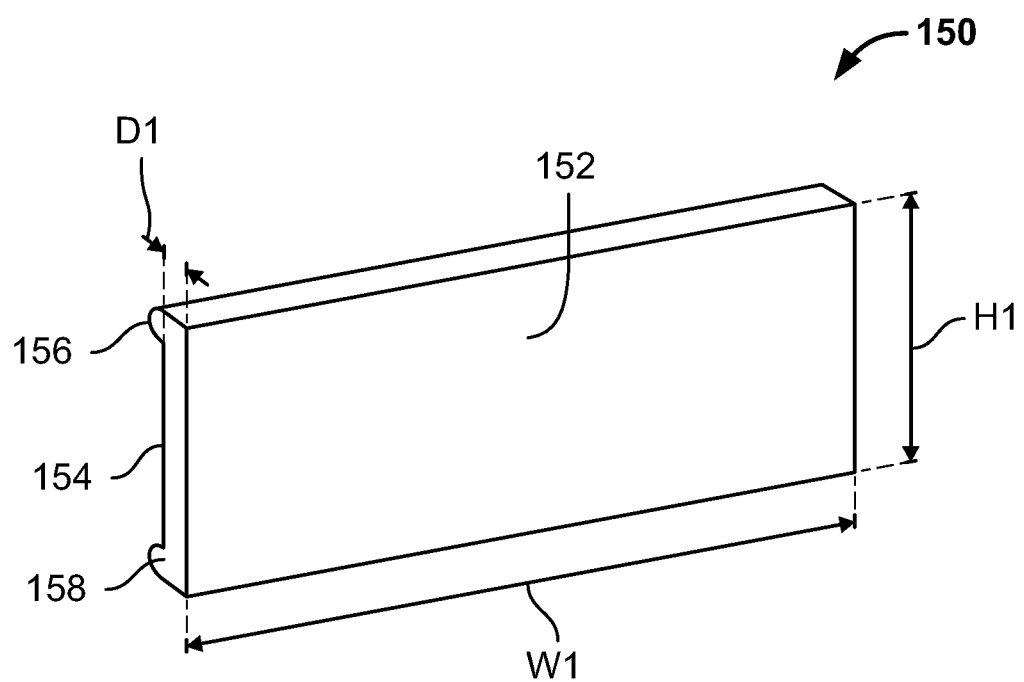
FIG. 3A is an isometric view of a top, front, and left side of one embodiment of a stabilizer.
Figure 3B:
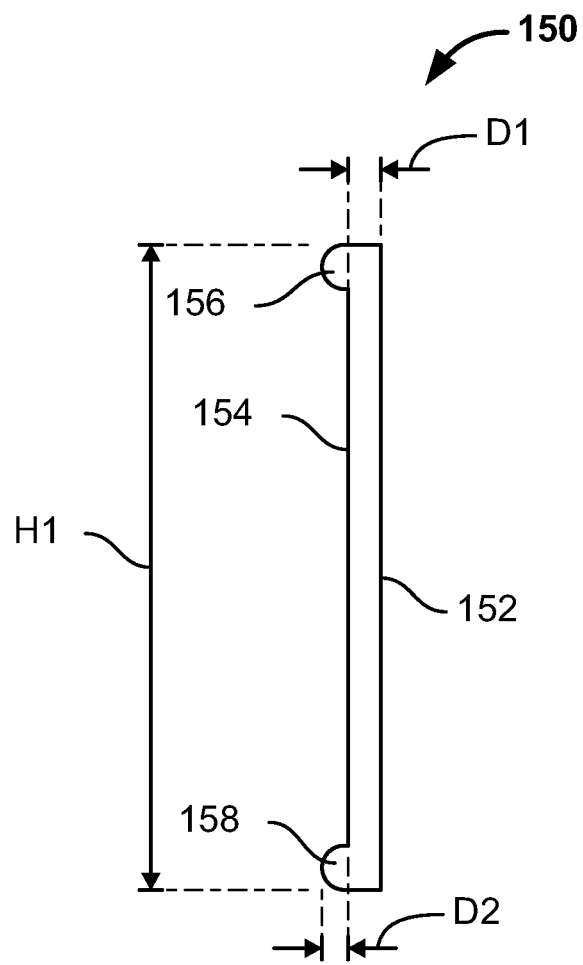
FIG. 3B is a left side elevational view of the stabilizer of FIG. 3A.

FIGS. 3A and 3B illustrate one embodiment of a stabilizer 150 designed for use with one or more composite panels 112. The stabilizer 150 is substantially rectangular and includes an interior surface 152 and a corresponding exterior surface 154. In this embodiment, the interior surface 152 and the exterior surface 154 are substantially flat surfaces. In alternative embodiments, the interior surface 152 and the exterior surface 154 may be convex, concave, rough, or uneven. In particular, the interior surface 152 may be provided in a particular form that conforms to the shape of the outer surface of the outer sheet 132 of the composite panel 112 to which the stabilizer 150 may be attached.

In an illustrative embodiment, the stabilizer 150 may be defined by a height H1, a width W1, and a depth D1. In one example, the stabilizer 150 may have a height H1 between about 2 centimeters to about 25 centimeters and, in particular embodiments, between about 8.5 centimeters to about 11 centimeters. The stabilizer 150 may also have a depth D1 ranging approximately between about 0.1 centimeters to about 5 centimeters and, in particular embodiments, between about 0.25 centimeters to about 0.5 centimeters. Further, the width W1 of the stabilizer 150 may range between about 0.02 meters to about 10 meters and, in particular embodiments, between about 10 centimeters to about 20 centimeters.

The stabilizer 150 may also include slightly curved portions or bulbs 156, 158 extending from an upper edge and a lower edge of the exterior surface 154. The upper bulb 156 and the lower bulb 158 generally include a curved outer surface protruding outwardly a distance D2 (see FIG. 3B) from the exterior surface 154 of the stabilizer 150. In this particular embodiment, the upper bulb 156 extends from an upper end of the exterior surface 154 and the lower bulb 158 extends from a lower end of the exterior surface 154. Further, during use, the upper bulb 156 and the lower bulb 158 may act to protect the rivets 122, or alternative fasteners, against shearing. Therefore, in the some embodiments, the distance D2 may be greater than a distance the rivets 122 project outwardly from the exterior surface 154 (see FIG. 6). As such, the upper bulb 156 and the lower bulb 158 project beyond the rivets 122. Further, the stabilizer 150 may be made of a metal, metal alloy, or any suitable material of the like. Specifically, the stabilizer 150 may be made of aluminum or rolled steel and may be galvanized.

Figure 3C:
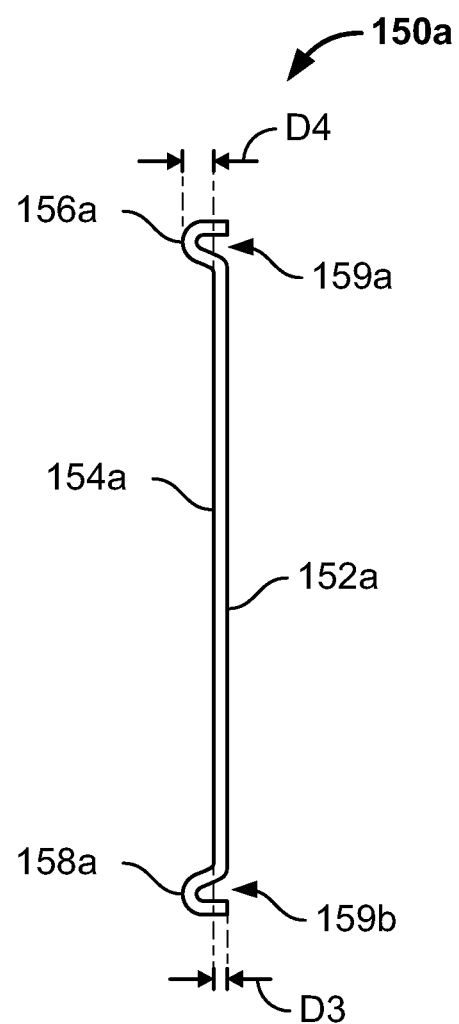
FIG. 3C is a left side elevational view of an alternative embodiment of the stabilizer of FIG. 3A.

FIG. 3C illustrates an alternative embodiment of a stabilizer 150a that includes an interior surface 152a and an exterior surface 154a that are substantially flat. Further, similar to the stabilizer 150 shown in FIGS. 3A and 3B, the stabilizer 150a also includes an upper bulb 156a and a lower bulb 158a. In this embodiment, the stabilizer 150a may have a depth D3, and the upper bulb 156a and the lower bulb 158a may protrude a distance D4 from the exterior surface 154a of the stabilizer 150a.

Further, the upper bulb 156a and the lower bulb 158a may include a recess 159 therein. In particular, the upper bulb 156a includes a recess 159a and the lower bulb 158a includes a recess 159b. The recesses 159a, 159b may be provided individually, and may lower the material cost of the stabilizer 150a, may lower the weight of the stabilizer 150a, and/or may increase the flexibility of the bulbs 156a, 158a.

Figure 4A:
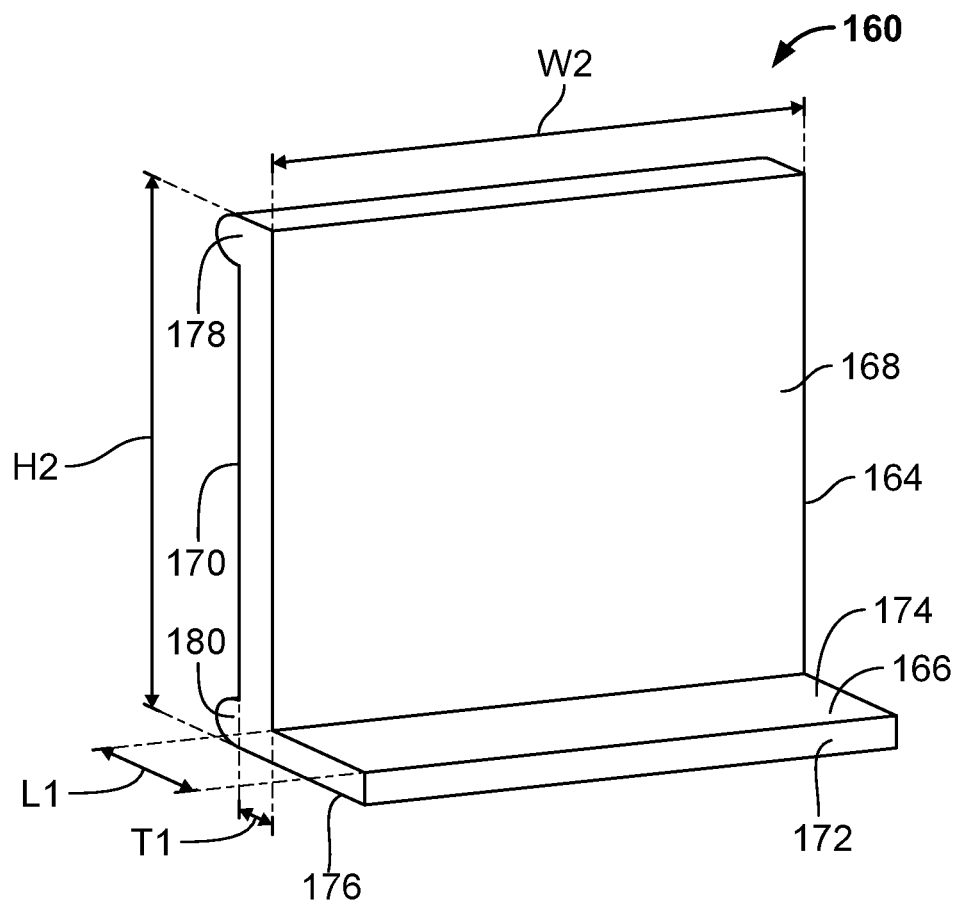
FIG. 4A is an isometric view of a top, front, and left side of another embodiment of a stabilizer.
Figure 4B:
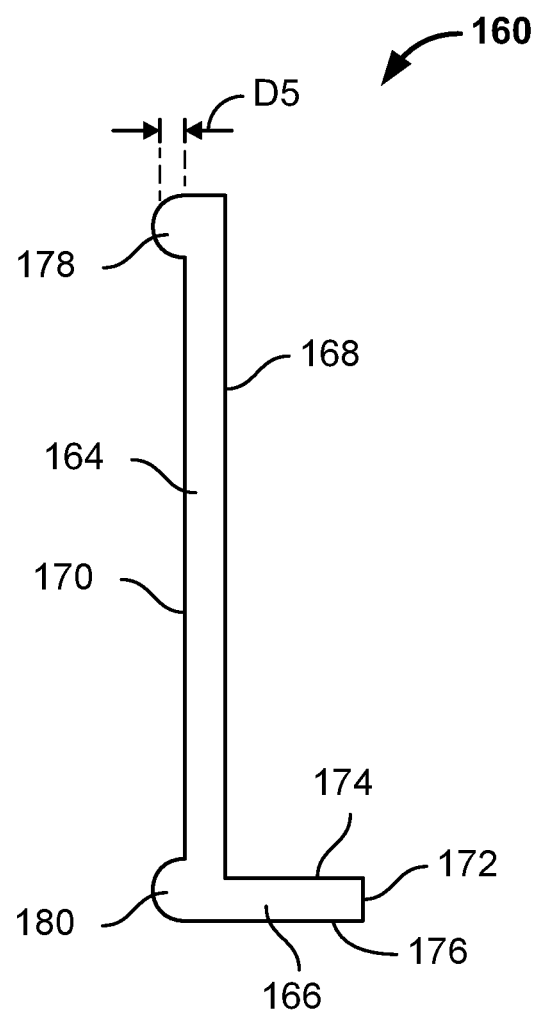
FIG. 4B is a left side elevational view of the stabilizer of FIG. 4A.

FIGS. 4A and 4B depict an alternative embodiment of a stabilizer 160. The stabilizer 160 may be provided with a substantially L-shaped body that may include a vertical sidewall 164 that terminates at a lower horizontal wall 166. The vertical sidewall 164 includes an interior surface 168 and an exterior surface 170. Further, the lower horizontal wall 166 may protrude outwardly from a lower edge of the vertical sidewall 164 and may terminate at a front end wall 172. The horizontal wall 166 may also include an upper surface 174 and a bottom surface 176. The stabilizer 160 may further include slightly curved portions, or an upper bulb 178 and a lower bulb 180 extending from an upper edge and a lower edge, respectively, of the vertical sidewall 164.

Figure 5A:
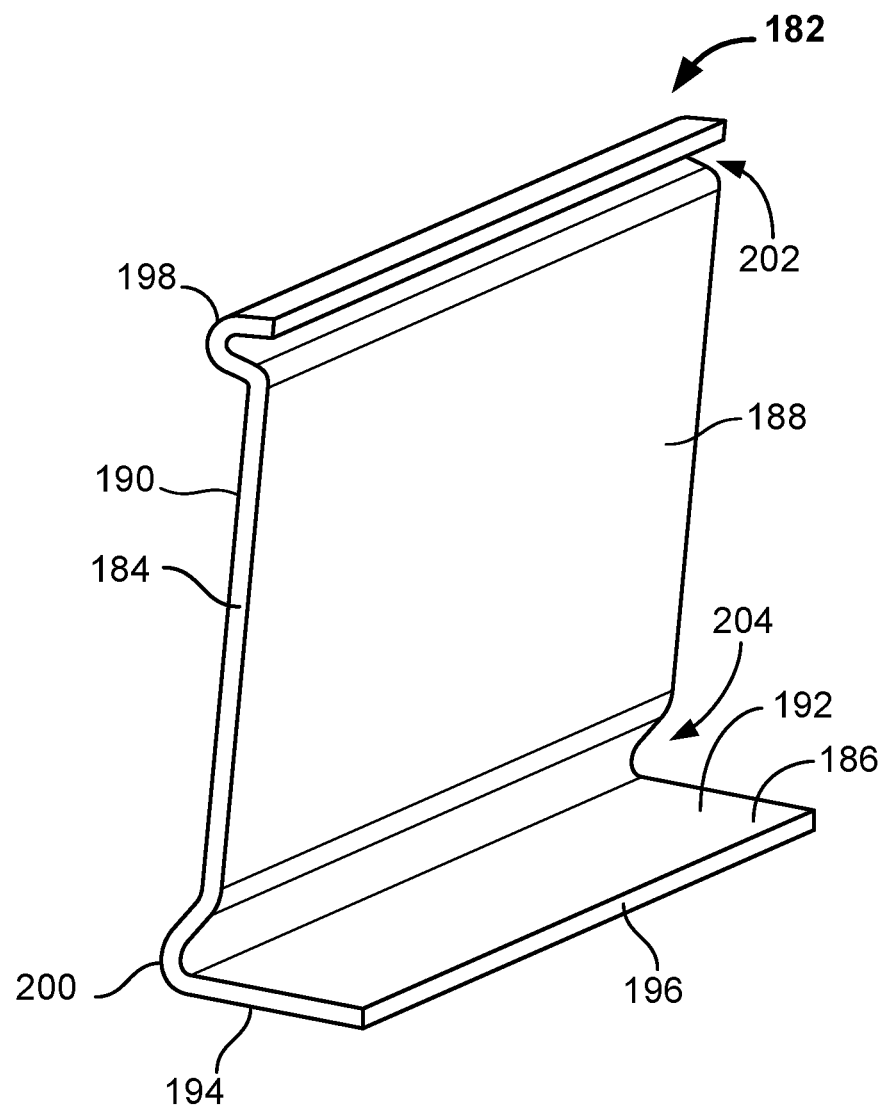
FIG. 5A is an isometric view of a top, front, and left side of an alternative embodiment of the stabilizer of FIG. 4A.
Figure 5B:
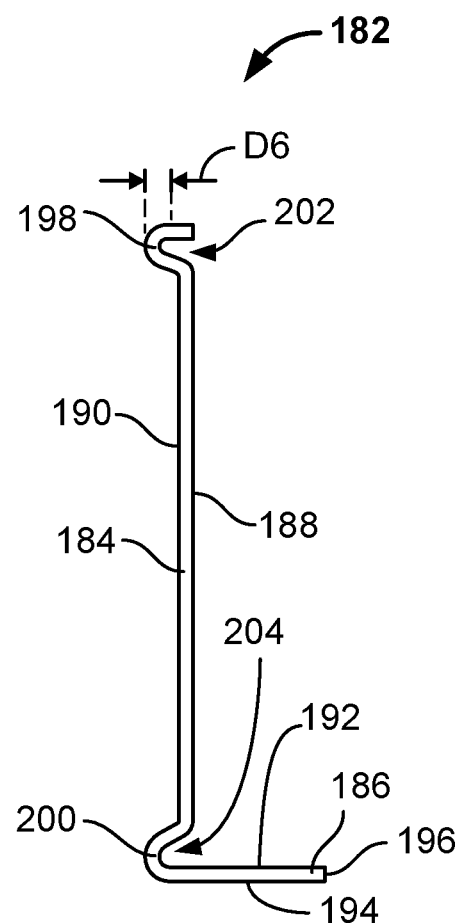
FIG. 5B is a left side elevational view of the stabilizer of FIG. 5A.

In another embodiment, FIGS. 5A and 5B depict a stabilizer 182 that includes a substantially L-shaped body with a vertical sidewall 184 and a lower horizontal wall 186. The vertical sidewall 184 may include an interior surface 188 and an exterior surface 190. The lower horizontal wall 186 may extend outwardly from a bottom end of the vertical sidewall 184 and may be defined by an upper surface 192, a bottom surface 194, and a front end wall 196.

Further, the stabilizer 182 may also include an upper bulb 198 and a lower bulb 200. The upper bulb 198 and the lower bulb 200 may each have a recess 202, 204, respectively. The recesses 202, 204 define interior surfaces of the upper bulb 198 and the lower bulb 200, respectfully. The recesses 202, 204 may be provided individually, and may lower the material cost of the stabilizer 182, may lower the weight of the stabilizer 182, and/or may increase the flexibility of the bulbs 198, 200. The upper bulb 198 and the lower bulb 200 may act to protect the rivets 122, or alternative fasteners, against shearing. Therefore, in some embodiments, the upper bulb 198 and the lower bulb 200 may protrude a distance D6 (see FIG. 5B) from the vertical sidewall 184 that is greater than a distance the rivets 122 may project from the vertical sidewall 184.

In some embodiment, the stabilizers 160, 182 may be defined by a height H2, a width W2, and a thickness T1. Further, the upper bulbs 178, 198 and the lower bulbs 180, 200 may be defined, respectively by an outer boundary circumference or a distance D5, D6 from which the upper bulbs 178, 198 and the lower bulbs 180, 200 protrude from the vertical sidewalls 164, 184. In this particular embodiment, the upper bulbs 178, 198 extend a distance substantially equal to a distance the lower bulbs 180, 200 extend. However, in alternative embodiments, the distance D5, D6 the upper bulbs 178, 198 extend may be independent of the distance D5, D6 the lower bulbs 180, 200 extend.

Further, in some embodiments, the stabilizers 160, 182 have a relatively equal thickness T1 throughout. In one embodiment, the stabilizer 160 shown in FIGS. 4A and 4B has a relative thickness between about 0.025 centimeters to about 2.5 centimeters and, in particular embodiments, between about 0.1 centimeters to about 0.2 centimeters. However, in alternative embodiments, the vertical sidewall 164 may have a thickness that differs from the thickness of the lower horizontal wall 166.

The stabilizers 160, 182 may also have a height H2 ranging between about 5 centimeters to about 20 centimeters and, in particular embodiments, between about 8 centimeters and about 12 centimeters. The upper bulbs 178, 198 and the lower bulbs 180, 200 may each, respectively, have a depth D5, D6 ranging between about 0.1 centimeters to about 1.5 centimeters and, in particular embodiments, between about 0.3 centimeters to about 0.75 centimeters.

The stabilizers discussed herein may be provided as a metal, a metal alloy or any suitable material of the like. In the embodiment depicted in FIG. 4, the stabilizer 160 is an aluminum material. Alternatively, in the embodiment depicted in FIG. 5, the stabilizer 182 is a rolled steel material. Further, the stabilizers may be galvanized.

Figure 6:
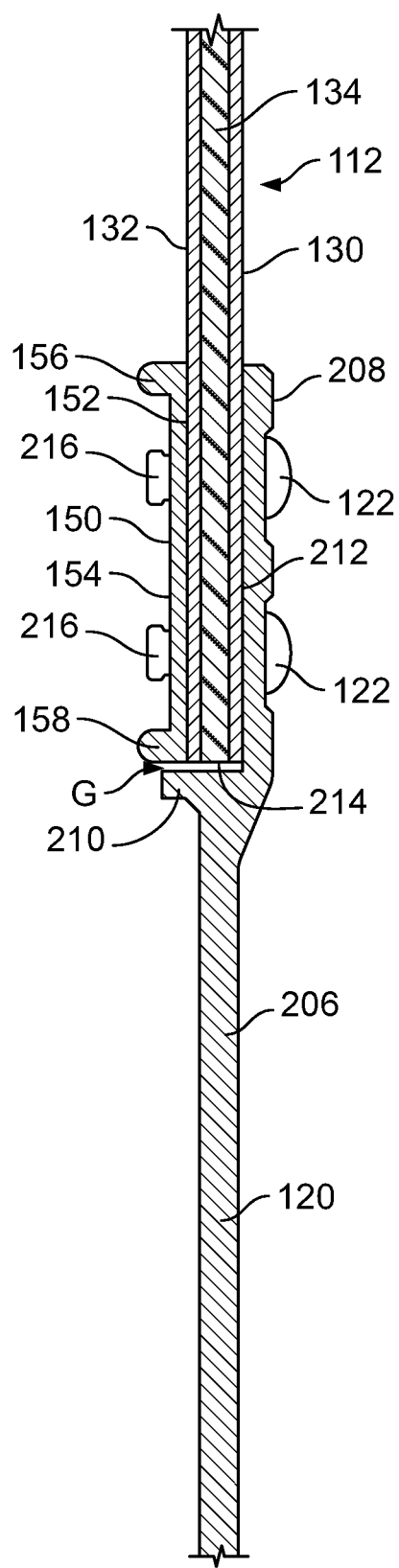
FIG. 6 is a partial cross-sectional side view of an embodiment of the stabilizer of FIG. 3 in an in-use configuration.

FIG. 6 shows one composite panel 112 coupled to the bottom rail 120 of the trailer 102 using the stabilizer 150 and a plurality of rivets 122. The bottom rail 120 may include a lower extension 206, an upper extension 208, and a ledge 210 that juts outwardly. In the present embodiment, the stabilizer 150 may also be used to fasten the composite panel 112 to any of the top rail 118, the vertical rail 124, the splicing plate 116, and/or the logistics plate (not shown).

In this embodiment, the composite panel 112 includes the core member 134 that comprises at least partially hollow thermoplastic material. In some instances, the partially hollow thermoplastic material may be provided in the composite panel 112 in an area designed to receive one or more rivets 122 for fastening. In order to fasten the composite panel 112 using the stabilizer 150, the composite panel 112 may be positioned between an exterior surface 212 of the upper extension 208 of the bottom rail 120 and the interior surface 152 of the stabilizer 150. In the embodiment depicted, a small gap G may be created between a bottom edge 214 of the composite panel 112 and the ledge 210 of the bottom rail 120 to allow fluid buildup from inside of the composite panel 112 to drain.

Further, in order to secure the composite panel 112 to the bottom rail 120, the stabilizer 150 may be positioned in line with the bottom edge 214 of the composite panel 112 and a plurality of rivets 122 may be driven through the bottom rail 120, the composite panel 112, and the stabilizer 150. When the rivet 122 is driven through the bottom rail 120, the composite panel 112, and the stabilizer 150, an end 216 of the rivets 122 may flare to assist in holding the stabilizer 150 in place. Due to the size and the shape of the stabilizer 150 and the single shear design shown in FIG. 6, the stabilizer 150 may be applied to a variety of composite panels with a multitude of sizes. Therefore, it is within the scope of this disclosure to apply the stabilizer 150 to composite panels having different dimensions (e.g., different thicknesses, widths, heights, etc.).

Figure 7:
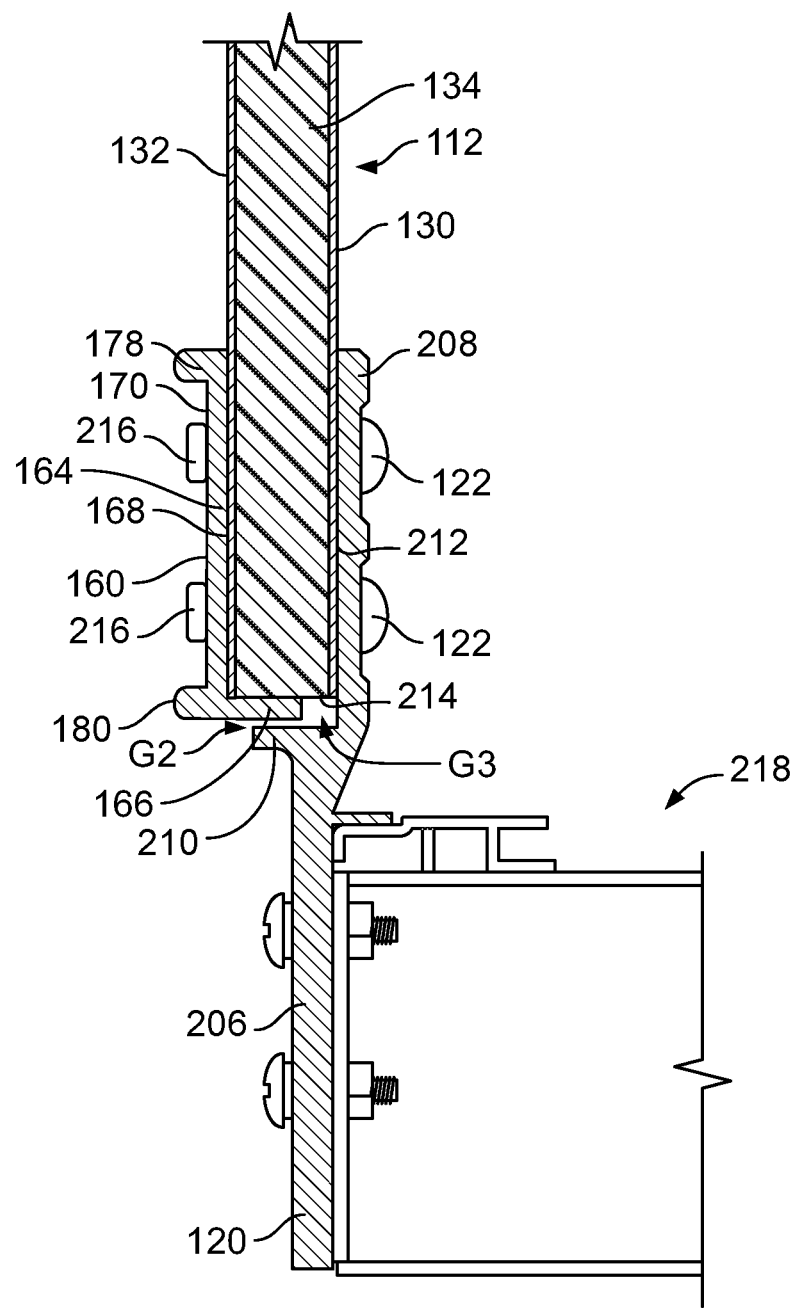
FIG. 7 is a partial cross-sectional side view of an embodiment of the stabilizer of FIG. 4 in an in-use configuration.

FIG. 7 depicts a different embodiment of the stabilizer 160 being used to secure the composite panel 112 to the bottom rail 120 of the trailer 102 via a plurality of rivets 122. For illustrative purposes, a floor assembly 218 of the trailer 102 is shown. In this embodiment, the composite panel 112 includes the core member 134 comprising at least a partially hollow thermoplastic material. In order to fasten the composite panel 112 using the stabilizer 160, the composite panel 112 may be positioned between the exterior surface 212 of the upper extension 208 of the bottom rail 120 and the interior surface 168 of the vertical sidewall 164 of the stabilizer 160.

To secure the composite panel 112, the interior surface 168 of the vertical sidewall may be positioned flush with the outer sheet 132 of the composite panel 112. Further, the upper surface 174 of the horizontal wall 166 of the stabilizer 160 in FIG. 7 is positioned adjacent the bottom edge 214 of the composite panel 112 and the bottom surface 176 of the horizontal wall 166 of the stabilizer 160 may be positioned adjacent to the ledge 210. Still further, the front end wall 172 of the horizontal wall 166 may be positioned adjacent the exterior surface 212 of the upper extension 208 of the bottom rail 120.

In a particular embodiment, a small gap G2 is created between the horizontal wall 166 and the ledge 210, and a small gap G3 is created between the front end wall 172 of the horizontal wall 166 and the exterior surface 212 of the upper extension 208 of the bottom rail 120. As previously mentioned, the gaps G2, G3 may allow fluid buildup from inside the composite panel 112 to drain. After being positioned, a plurality of rivets 122 may be driven through the bottom rail 120, the composite panel 112, and the stabilizer 160. Although a gap is depicted in FIGS. 6 and 7, in other embodiments, the composite panel 112 and the stabilizer may contact the upper edge of the ledge 210 such that the gap is substantially sealed.

It should be appreciated that any of the stabilizers described herein are designed to be used in the manner depicted in FIGS. 6 and 7 in a single shear configuration.

Due to the size and shape of the stabilizer 160 and the single shear design, the stabilizer 160 may be applied to a variety of composite panels with a multitude of sizes. Therefore, it is within the scope of this disclosure to apply the stabilizer 160 to composite panels having different dimensions (e.g., different thicknesses, materials, widths, heights, etc.).

In some additional embodiments, an adhesive (not shown) may be provided between the composite panel 112 and one or more of the stabilizer and/or the various sections of the bottom rail 120.

Although the composite panel 112 and the core member 134 have been discussed with respect to a tractor trailer application, it should be appreciated that the composite panel 112, core member 134, and/or any associated parts may be used in other applications such as, for example, other automotive and transportation applications, furniture applications, architecture applications and building materials, packing materials and logistics applications, aerospace applications, and the like.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

I claim:

1. A single shear fastening assembly for a tractor trailer, comprising:
   a rail configured to support at least a portion of the tractor trailer;
   a composite panel having at least a partially hollow core;
   a stabilizer positioned adjacent the composite panel; and
   a plurality of fasteners extending through the rail, the composite panel, and the stabilizer to secure the composite panel to the rail in a single shear configuration.

2. The single shear fastening assembly for a tractor trailer of claim 1, wherein the stabilizer is provided in a form of a rectangular body having a flat interior surface and a flat exterior surface.

3. The single shear fastening assembly for a tractor trailer of claim 2, wherein the stabilizer comprises at least one bulb protruding outwardly from the flat exterior surface.

4. The single shear fastening assembly for a tractor trailer of claim 3, wherein the stabilizer comprises a first bulb protruding outwardly from an upper edge of the flat exterior surface and a second bulb protruding outwardly from a lower edge of the flat exterior surface.

5. The single shear fastening assembly for a tractor trailer of claim 4, wherein the first bulb and the second bulb protrude outwardly from the flat exterior surface a distance greater than a distance that the plurality of fasteners protrude outwardly from the flat exterior surface.

6. The single shear fastening assembly for a tractor trailer of claim 5, wherein the first bulb and the second bulb each include a recess therein.

7. The single shear fastening assembly for a tractor trailer of claim 1, wherein the composite panel further comprises an inner metallic sheet and an outer metallic sheet, and wherein the rail is positioned adjacent the inner metallic sheet of the composite panel and the stabilizer is positioned adjacent the outer metallic sheet of the composite panel.

8. The single shear fastening assembly for a tractor trailer of claim 7, wherein a gap is defined between a bottom edge of the stabilizer and a ledge of the rail.

9. The single shear fastening assembly for a tractor trailer of claim 1, wherein the plurality of fasteners are a plurality of rivets.

10. A single shear fastening mechanism configured to secure a composite panel to a rail of a tractor trailer via at least one fastener, the single shear fastening mechanism comprising:
    a rectangular stabilizer body comprising a vertical sidewall having an interior surface and an exterior surface, the interior surface configured to contact an outer sheet of the composite panel and the rail configured to contact an inner sheet of the composite panel opposite the outer sheet;
    an upper bulb protruding from an upper edge of the exterior surface of the vertical sidewall and extending uninterrupted along a width of the rectangular stabilizer body;
    a lower bulb protruding from a lower edge of the exterior surface of the vertical sidewall and extending uninterrupted along a width of the rectangular stabilizer body; and
    wherein the rectangular stabilizer body is configured to be positioned relative to the composite panel and the rail to secure the composite panel to the rail in a single shear configuration when the fastener is inserted through the rail, the composite panel, and the vertical sidewall.

11. The single shear fastening mechanism of claim 10, wherein the upper bulb and the lower bulb each include a recess therein.

12. The single shear fastening mechanism of claim 10, wherein the rectangular stabilizer body is formed from a metal or metal alloy.

13. The single shear fastening mechanism of claim 10, wherein the rectangular stabilizer body is aluminum or rolled steel and is galvanized.

14. The single shear fastening mechanism of claim 10, wherein an outer boundary circumference of the upper bulb and the lower bulb is substantially equal.

15. The single shear fastening mechanism of claim 10, wherein the rectangular stabilizer body includes a height dimension between about 8.5 centimeters to about 11 centimeters, a depth dimension between about 0.25 centimeters to about 0.5 centimeters, and a width dimension of between about 10 centimeters to about 20 centimeters.

16. A method of fastening a composite panel to a rail of a tractor trailer assembly, comprising the steps of:
    providing a rail of a tractor trailer, a composite panel, a stabilizer, and at least one fastener;
    positioning an inner sheet of the composite panel adjacent the rail of the tractor trailer;
    positioning the stabilizer adjacent an outer sheet of the composite panel; and
    inserting the at least one fastener through the rail of the tractor trailer, the composite panel, and the stabilizer to secure the composite panel to the rail in a single shear configuration.

17. The method of fastening a composite panel to a rail of a tractor trailer assembly of claim 16 further comprising the step of defining a gap between a bottom edge of the stabilizer and a lower ledge of the rail of the tractor trailer.

18. The method of fastening a composite panel to a rail of a tractor trailer assembly of claim 16 further comprising the step of fastening a plurality of composite panels to the rail to form a portion of the tractor trailer assembly.

19. The single shear fastening mechanism of claim 10 further including a horizontal sidewall protruding from an interior surface at an end of the vertical sidewall to form a substantially L-shaped body.

20. The method of fastening a composite panel to a rail of a tractor trailer assembly of claim 16 further comprising the step of positioning a bottom edge of the stabilizer in line with a bottom edge of the composite panel.

* * * * *